April 28, 1970   J. E. WOOLLEY   3,508,652
METHOD OF AND APPARATUS FOR SEPARATING OIL FROM WATER
Filed Jan. 11, 1968
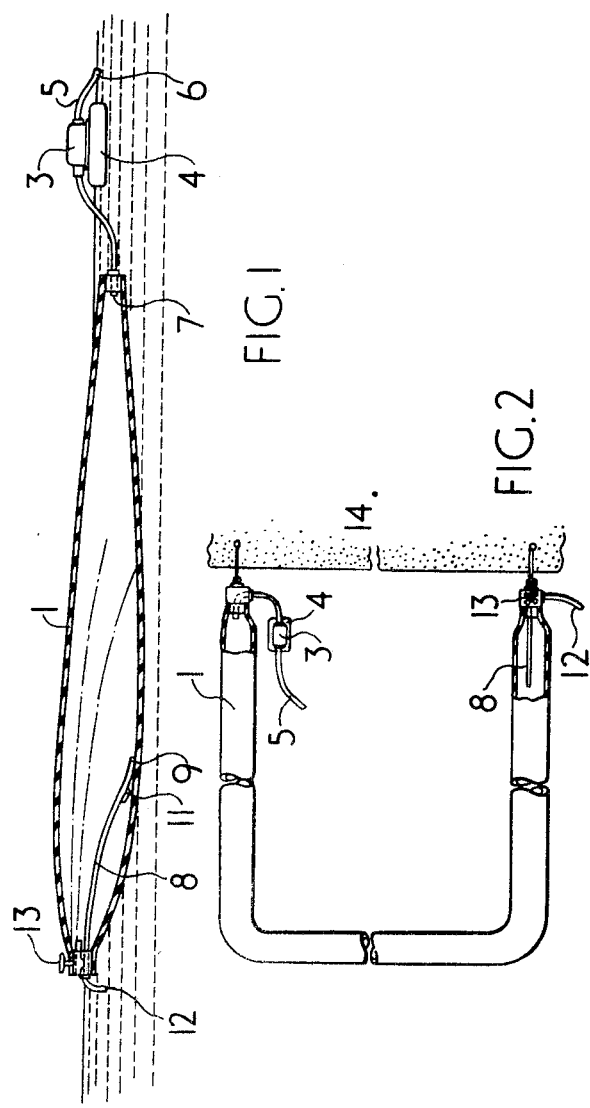

United States Patent Office 3,508,652
Patented Apr. 28, 1970

3,508,652
METHOD OF AND APPARATUS FOR SEPARATING OIL FROM WATER
John E. Woolley, Southport, England, assignor to The Dunlop Company Limited, London, England, a British company
Filed Jan. 11, 1968, Ser. No. 700,670
Claims priority, application Great Britain, Jan. 11, 1967, 1,636/67
Int. Cl. B01d 17/02
U.S. Cl. 210—76    5 Claims

ABSTRACT OF THE DISCLOSURE

A method and apparatus for separating oil from water, particularly oil floating on the surface in a dock or at sea, in which an oil/water mixture is pumped continuously into one en dof an elongated container in which the mixture separates into an upper oil layer and a lower water layer, and water is drained continuously from the lower water layer.

---

This invention relates to a method of and apparatus for separating oil from water.

Ships, especially oil tankers, frequently discharge oil into the water in a dock or at sea, and it is desirable to periodically remove such oil. One known way of removing such oil is to suck or pump the oil, together with a large quantity of wtaer, into a container. Where an area of water near land is being cleared of oil, for example in a harbour, the container is located on land and the oil/water mixture therein is passed through a separator, which may be of the rotary scraper type. Where the area of water is relatively far from land, the container is for example a barge, and when the barge is full of oil/water mixture, it is brought back to dock and the mixture pumped ashore to the separator. In each case, large quantities of water are brought ashore and, in the latter case, are conveyed to shore from the area of water being cleared.

It is an object of the present invention to provide a method of and apparatus for separating oil from water which enables the separation to be carried out at the site being cleared.

The present invention provides a method of separating oil from water including continuously passing an oil/water mixture into a container or envelope such that the mixture passes along the container and separates into an upper oil layer and a lower water layer as it passes along the container, and continuously draining water out of the container from the lower water layer.

The present invention also provides apparatus for separating oil from water including a container having inlet means for pumping oil-water mixture continuously into the container through the inlet means at a predetermined rate, and outlet means so located in relation to the inlet means having regard to said predetermined rate that the oil/water mixture separates as it passes along the container from the inlet means into an upper oil layer and a lower water layer and the outlet means drains water continuously from the water layer.

The operation is continued until oil starts to appear from the watero utlet, thus indicating that the container is substantiallly full of oil. The container is then emptied of oil, and the operation commenced again.

The container may be an elongated flexible container or envelope capable of floating in water when containing a sufficient amount of air and/or oil, alternatively the container may be rendered buoyant by any suitable means.

Embodiments of the present invention will now be described, by way of example, with reference to the accompanying diagrammatic drawings of which:

FIGURE 1 is a side view of separating apparatus for cleaning oil from water at a site away from land, and FIGURE 2 is a sideview of separating apparatus in a harbour.

Referring to FIGURE 1, separating appartus includes an elongated flexible container 1 which floats in the sea and is connected by an inlet pipe 7 to a pontoon 4, the pipe 7 being secured to the front end of the container 1.

A pump 3 carried by the pontoon 4 sucks in oil/water mixture from the surface of the sea through a pump inlet pipe 5 having a wide mouth 6 which can be maintained at any required depth below the surface of the water. The mixture drawn in along the pipe 5 by the pump 3 is pumped through the pipe 7 into the front end of the container 1.

An outlet pipe 8 at the rear end of the container 1 has its mouth 9 within the container 1 near its rear end, and the pipe mouth 9 is weighted by a weight 11 so that the pipe mouth 9 always rests on the bottom of the container 1. The pipe 8 passes through the rear end of the container 1 so that the pipe outlet 12 is outside the container 1. The upper part of the rear end of the container 1 has a vent valve 13.

In use, the container 1 and pontoon 4 are towed through the water in the area from which it is desired to remove the oil by a tow rope (not shown) extending from a towing vessel to the pontoon 4, the pipe 7 also acting as a tow line between the pontoon 4 and the container 1. The pump 3 is then operated to continuously pump oil/water mixture from the surface of the water into the container 1. Initially, the container 1 may be full of air, so the vent 13 is opened until liquid is expelled from it, thus indicating that most of the air in the container 1 has been removed. The vent 13 is then closed.

The mixture is pumped into the container 1 at such a rate that it separates into an upper oil layer and a lower water layer before it reaches the mouth 9 of the pipe 8. Thus as mixture is pumped into the container 1, water will be expelled from the container 1 through the pipe 8. The oil is therefore retained in the container 1 and, when the container 1 is nearly full of oil, this will be indicated by the issue of oil instead of water from the pipe 12. The pump 3 is then stopped, the inlet and outlet pipes are closed, and the container 1 towed back to shore, where the container 1 is emptied.

The pump 3 may be electrically operated by a power supply on the towing vessel, and in this case the tow rope between the towing vessel and the pontoon is preferably relatively short for convenience in feeding the electrical supply to the pump 3.

FIGURE 2 shows apparatus for use in a dock. The container 1 has its opposite ends anchored in spaced-apart positions to the shore 14 in such a manner that the container 1 and shore 14 surround the area of water from which it is desired to remove oil. The apparatus is operated in the same manner as the apparatus described with reference to FIGURE 1.

The container or envelope 1 may be initially caused to substantially surround an area of water, and may then be pulled towards the shore to trap the oil between the container 1 and the shore. Part of the container 1 may be pulled ashore, thus diminishing the area surrounded and concentrating the oil. In this case, the container 1 may have several normally closed access points spaced along its length and to any one of which the pipe 7 can be connected.

With both embodiments, the apparatus is operated until the container 1 is substantially full of oil. Thus it is not necessary to convey large quantities of water ashore in a mixture in either embodiment, and, with the apparatus described with reference to FIGURE 1, it is not necessary to convey such water back to shore from the site being cleared. Thus the time and expense involved in conveying such large quantities of water is eliminated.

Having now described my invention, what I claim is:

1. A method of collecting oil floating at the surface of a body of water; comprising the steps of:
   (1) floating a separation chamber in the form of a flexible envelope in the body of the water;
   (2) pumping water and oil from the surface of the body of water into the envelope until the envelope is substantially full;
   (3) allowing the water and oil in the envelope to separate into a water layer and an oil layer; and
   (4) forcing fluid from the water layer to flow out of the envelope by continuously pumping water and oil into the envelope while separation of the oil and water already in the envelope continues.

2. A method according to claim 1 further comprising: providing an elongated envelope; anchoring its ends at spaced-apart positions at the edge of the body of water; and drawing the envelope towards the edge so as to diminish the area of the surface of the body of water enclosed by the envelope and the edge.

3. Apparatus for collecting oil floating at the surface of a body of water, comprising a floatable separation chamber in the form of a flexible envelope, fluid inlet means for the envelope, a pump to pump water and oil from the region of the surface of the body of water through the inlet means into the envelope for separation in the envelope into an oil layer and a water layer, and fluid outlet means to permit fluid in the water layer to flow out of the envelope.

4. Apparatus according to claim 3 wherein the fluid outlet means comprises a flexible outlet conduit to permit outflowing fluid to pass therethrough, the inlet end of said conduit being arranged to sink in water.

5. Apparatus according to claim 3 wherein the fluid inlet means comprises a plurality of normally closed access points spaced from one another along the length of the envelope and to any one of which an inlet conduit may be connected.

References Cited

UNITED STATES PATENTS

| 1,397,891 | 11/1921 | Jones | 210—242 X |
| 2,891,672 | 6/1959 | Veld et al. | 210—242 |
| 2,986,279 | 5/1961 | Henigman | 210—83 X |
| 3,221,884 | 12/1965 | Muller | 210—242 |

FOREIGN PATENTS

| 590,252 | 1/1960 | Canada. |
| 742,347 | 12/1955 | Great Britain. |

JOHN W. ADEE, Primary Examiner

U.S. Cl. X.R.

210—83, 242, 539, 540